US012612890B2

(12) United States Patent
Zhou et al.

(10) Patent No.: US 12,612,890 B2
(45) Date of Patent: Apr. 28, 2026

(54) KINETIC ENERGY RECOVERY WIND-WAVE INTEGRATED SYSTEM

(71) Applicant: South China University of Technology, Guangzhou City (CN)

(72) Inventors: Binzhen Zhou, Guangzhou City (CN); Xu Huang, Guangzhou City (CN); Peng Jin, Guangzhou City (CN); Zhi Zheng, Guangzhou City (CN); Yi Xiao, Guangzhou City (CN); Zedong Wang, Guangzhou City (CN); Jianjian Hu, Guangzhou City (CN); Hengming Zhang, Guangzhou City (CN); Lei Wang, Guangzhou City (CN); Yuming Yuan, Guangzhou City (CN)

(73) Assignee: South China University of Technology, Guangzhou City (CN)

( * ) Notice: Subject to any disclaimer, the term of this patent is extended or adjusted under 35 U.S.C. 154(b) by 0 days.

(21) Appl. No.: 18/418,361

(22) Filed: Jan. 22, 2024

(65) Prior Publication Data

US 2025/0172119 A1 May 29, 2025

(30) Foreign Application Priority Data

Nov. 27, 2023 (CN) ......................... 202311592379.5

(51) Int. Cl.
*F03B 13/22* (2006.01)
*B63B 35/44* (2006.01)

(52) U.S. Cl.
CPC .............. *F03B 13/22* (2013.01); *B63B 35/44* (2013.01); *B63B 2035/446* (2013.01);
(Continued)

(58) Field of Classification Search
CPC . F03B 13/22; F05B 2220/707; F05B 2240/95
See application file for complete search history.

(56) References Cited

U.S. PATENT DOCUMENTS 3,696,251 A * 10/1972 Last ........................ H02K 35/00
310/15
7,323,790 B2 * 1/2008 Taylor .................... H02K 35/02
290/53

(Continued)

*Primary Examiner* — Tulsidas C Patel
*Assistant Examiner* — Thomas K Quigley
(74) *Attorney, Agent, or Firm* — Addison D. Ault; IPGentleman Intellectual Property Services, LLC

(57) ABSTRACT

This invention introduces a kinetic energy recovery wind-wave integrated system for offshore wind power generation. The system consists of a semi-submersible platform equipped with a fan and an internal wave energy device. The device includes a shell housing a Power Take-Off (PTO) system, featuring a permanent magnet synchronous linear motor and an active controller. The motor's stator is fixed inside the shell, while its mover is connected to a counter-weight block outside the stator, linked to the shell's top via a spring. Limiters are installed at both ends of the shell to restrict the counterweight block's movement. This system utilizes the wave energy device to absorb kinetic energy, which otherwise affects wind turbine stability, and converts it into usable electrical energy via the PTO system. This enhances the stability and safety of offshore wind turbine power generation.

5 Claims, 5 Drawing Sheets

(52) U.S. Cl.
CPC ... *B63B 2035/4466* (2013.01); *F05B 2200/10* (2013.01); *F05B 2220/70642* (2013.01); *F05B 2220/707* (2013.01); *F05B 2240/95* (2013.01)

(56) References Cited

U.S. PATENT DOCUMENTS 7,538,445 B2 * 5/2009 Kornbluh ................ F03B 13/20 290/53
7,649,276 B2 * 1/2010 Kornbluh ................ F03B 13/20 290/53
8,067,849 B2 * 11/2011 Stewart ................... F03B 13/20 290/53
8,130,086 B2 * 3/2012 Choi ...................... H02K 33/16 340/407.1
8,581,431 B2 * 11/2013 Grassi ..................... F03B 13/20 290/53
8,629,572 B1 * 1/2014 Phillips ................... F03B 13/16 290/53
8,723,353 B1 * 5/2014 Franklin ................. F03B 13/20 290/53
8,763,389 B2 * 7/2014 Stewart ................... F16H 21/44 60/497
8,946,919 B2 * 2/2015 Phillips ............... F03B 13/1855 290/53
8,946,920 B2 * 2/2015 Phillips ................. H01F 7/0273 290/53
8,952,560 B2 * 2/2015 Phillips ............... F03B 13/1855 290/53
8,963,358 B2 * 2/2015 Phillips ................. H02M 7/064 290/53
9,476,400 B2 * 10/2016 Phillips ................. H02M 7/064
9,624,900 B2 * 4/2017 Phillips ................. H02M 7/066
9,644,601 B2 * 5/2017 Phillips .................. H02K 35/02
10,011,910 B2 * 7/2018 Phillips ..................... C25B 1/04
10,047,717 B1 * 8/2018 Phillips ................... F03B 13/20
10,982,654 B1 * 4/2021 Dehlsen .................. B63B 35/44
11,660,572 B2 * 5/2023 Dehlsen ............... B01D 61/026 210/321.72
12,018,646 B2 * 6/2024 Chen ......................... G01L 5/04
12,054,228 B2 * 8/2024 Bonnaffoux .......... B63B 21/502
2005/0218728 A1 * 10/2005 Stewart ............... F03B 13/1845 310/12.25
2005/0230206 A1 * 10/2005 Stewart ................... B60L 7/003 188/381
2006/0208839 A1 * 9/2006 Taylor .................... H02K 35/02 335/205
2007/0080539 A1 * 4/2007 Kelly .................. F03B 13/1855 290/42
2007/0257491 A1 * 11/2007 Kornbluh ................ F03B 13/20 290/53
2008/0306332 A1 * 12/2008 Choi ...................... H02K 33/16 600/38
2009/0085357 A1 * 4/2009 Stewart ................... F03B 13/20 290/53
2010/0164227 A1 * 7/2010 Grassi ..................... F03B 13/20 290/52
2010/0230965 A1 * 9/2010 Pitre ......................... F03D 9/25 290/55
2011/0133578 A1 * 6/2011 Choi ...................... H02K 33/18 310/25
2011/0241347 A1 * 10/2011 Boureau ................... F03D 9/25 405/195.1
2011/0258997 A1 * 10/2011 Kelly .................. F03B 13/1855 60/497
2012/0139261 A1 * 6/2012 Dick ...................... H02K 35/00 290/1 C
2013/0099496 A1 * 4/2013 Solheim .................. F03B 13/24 114/294
2013/0313838 A1 * 11/2013 Sakamoto ............. H02K 35/04 290/1 R
2014/0117673 A1 * 5/2014 Phillips .................. H02K 35/00 290/53
2014/0117674 A1 * 5/2014 Phillips .................. H02K 35/02 290/53
2014/0138953 A1 * 5/2014 Franklin ................. F03B 13/20 290/53
2014/0265348 A1 * 9/2014 Stone ...................... F02B 45/08 290/1 A
2014/0313001 A1 * 10/2014 Phillips ................. F03B 13/188 335/306
2014/0339928 A1 * 11/2014 Phillips ................. H02M 7/064 310/30
2015/0145258 A1 * 5/2015 Phillips .................. H02K 35/02 248/610
2015/0152835 A1 * 6/2015 Frtunik ................... F03B 15/00 290/53
2016/0010619 A1 * 1/2016 Phillips ................... F03B 13/16 290/53
2016/0146153 A1 * 5/2016 Hesselink ................. F02G 1/06 290/2
2016/0252071 A1 * 9/2016 Phillips ................. H02M 7/066 290/50
2017/0198401 A1 * 7/2017 Phillips .................. H02K 35/02
2018/0245564 A1 * 8/2018 Sheldon-Coulson ........................ H02K 7/075
2018/0312224 A1 * 11/2018 Alm ......................... F03B 13/26
2019/0078556 A1 * 3/2019 Stiesdal ................ B63B 21/502
2019/0226444 A1 * 7/2019 McCall ................ H02K 7/1869
2020/0010155 A1 * 1/2020 Robinson ................ F03D 9/008
2020/0063707 A1 * 2/2020 McCall ................ H02K 7/1869
2021/0009236 A1 * 1/2021 Houmard Le Gurun .................... F03D 13/25
2021/0146307 A1 * 5/2021 Dehlsen .................. C02F 1/441
2021/0222678 A1 * 7/2021 Ross ..................... B63B 35/003
2022/0081072 A1 * 3/2022 Bonnaffoux ............ F03D 13/25
2022/0234698 A1 * 7/2022 Shi .......................... B63B 21/20
2023/0049381 A1 * 2/2023 Aubault .................. B63B 43/06
2023/0099223 A1 * 3/2023 Lebon ..................... B63B 73/46 114/264
2023/0415853 A1 * 12/2023 Rosseland ............... B63B 21/26
2024/0034436 A1 * 2/2024 Moritz .................... B63B 21/50
2024/0110540 A1 * 4/2024 Foster ................. F03B 13/1815
2024/0140571 A1 * 5/2024 Cavichioli Gonzaga .................... B63B 79/10
2024/0183340 A1 * 6/2024 Grimsrud ................ F03D 13/25
2024/0301869 A1 * 9/2024 Wijning .................. B63B 77/10
2024/0308630 A1 * 9/2024 Kanner ................... B63B 35/44
2024/0308631 A1 * 9/2024 Ferrao ..................... B63B 35/44

* cited by examiner

KINETIC ENERGY RECOVERY WIND-WAVE INTEGRATED SYSTEM

TECHNICAL FIELD

The invention relates to the field of offshore wind power generation technology, in particular to a kinetic energy recovery wind-wave integrated system.

BACKGROUND ART

In recent years, with the continuous development of China's wind power industry from land to sea and from offshore to deep sea, compared with land, the sea wind flow is not blocked by topography, buildings, vegetation, etc., and wind speed is faster and more stable. Therefore, offshore wind turbines have more advantages in power generation and stability. With the increase in water depth, the problems of high cost and technical infeasibility exist in the construction of fixed foundations with the same height as water depth. Therefore, the floating wind turbine, which does not need to build an ultra-long support structure based on the seabed, has become the first choice for the development and utilization of rich wind energy resources in the deep sea. However, compared with onshore wind turbines and fixed offshore wind turbines, floating wind turbines face challenges brought by platform movement. Undersea conditions, periodic continuous wind and wave loads are the main causes of structural fatigue damage, resulting in increased failure rate of fan components and shortened service life. Under extreme sea conditions (typhoons, freak waves, etc.), sudden strong wind and wave loads can easily cause structural damage and capsizing, resulting in significant economic losses. Therefore, it is necessary to suppress the platform motion through active and passive control strategies.

The wind-wave integrated system has also become one of the current research frontiers and hotspots. However, the current research on the wind-wave integrated system focuses on the maximization of power generation and ignores the motion stability and safety guarantee under operating sea conditions and extreme sea conditions to a certain extent.

SUMMARY

The purpose of the invention is to provide a kinetic energy recovery wind-wave integrated system, which uses a wave energy device to absorb kinetic energy that is not conducive to the stability of the wind turbine and convert it into available electrical energy through the PTO system to solve the problem of low stability and safety of offshore wind turbine power generation.

In order to achieve the above purpose, the invention discloses a kinetic energy recovery wind-wave integrated system, including a semi-submersible platform, a fan is arranged on the semi-submersible platform, and a wave energy device is arranged inside the semi-submersible platform; the wave energy device includes a shell, an inner part of the shell is equipped with a PTO system; the PTO system includes a permanent magnet synchronous linear motor and an active controller, a stator of the permanent magnet synchronous linear motor is fixed inside the shell, a mover of the permanent magnet synchronous linear motor is fixedly connected to a counterweight block outside the stator, the counterweight block is connected to a top of the shell through a spring; limiters are set on the top and bottom of the shell to limit the counterweight block.

Preferably, the semi-submersible platform includes a lower pontoon, an upper part of the lower pontoon is provided with an upper pontoon, a bottom of the lower pontoon is provided with a base, and the inner part of the lower pontoon is provided with an installation groove for installing the wave energy device, a center of the semi-submersible platform is provided with an installation rod, the fan is arranged on the installation rod; an upper part of the installation rod is connected to the upper pontoon through an upper intermediate rod, a lower part of the installation rod is connected to the base through a lower intermediate rod; adjacent upper pontoons are connected by an upper connecting rod, and adjacent bases are connected by a lower connecting rod; a lower part of the installation rod is connected to the upper pontoon through a slant beam.

Preferably, the mover is arranged on a sliding rod, and two ends of the sliding rod are provided with counterweight blocks, the sliding rod is slidingly connected to a shell of the permanent magnet synchronous linear motor, and the mover and the counterweight blocks are rigidly connected through the sliding rod.

Preferably, the counterweight block and the shell form a multi-resonance system, a motion equation of the multi-resonance system is as follows:

$$\begin{cases} (M - m + A)\ddot{x}_{outer} = F_{water} - F_{PTO} \\ m\ddot{x}_{inner} = F_{PTO} \end{cases}$$

where M is a mass of the wave energy device, m is a mass of the counterweight block, and A is an additional mass, $\ddot{x}_{inner}$ is a motion acceleration of the counterweight block, $\ddot{x}_{outer}$ is a motion acceleration of the shell, $F_{water}$ is a force of the shell in the water, and $F_{PTO}$ is a force between the PTO system and the shell.

Preferably, a state of the wave energy device comprises a working mode and a survival mode; in the working mode, the wave energy device generates electricity; in the survival mode, the permanent magnet synchronous linear motor is shut down and the limiter is started to protect the wave energy device.

Preferably, when a freak wave appears in the sea, the wave energy device is in survival mode, otherwise, the wave energy device is in working mode;

conditions that satisfy the freak wave are as follows:

a maximum wave height $H_m$ is 2 times larger than an effective wave height $H_s$, denoted as $=H_m/H_s>2.0$.

The advantages and positive effects of the kinetic energy recovery wind-wave integrated system described in the invention are as follows:

1. The wave energy device in the invention is built in the lower pontoon, which makes the wave energy device isolate the complex marine environment and is beneficial to improve the stability and service life of the wave energy device. The invention uses the wave energy device to absorb the kinetic energy that is not conducive to the stability of the wind turbine and convert it into available electric energy through the PTO system. The wave energy power generation is used as a backup power source to store energy, and the 'recovered' energy is used for the wind turbine control and the active control of the wave energy device for sea energy for the sea.
2. The invention monitors the hydrodynamic environment of the waves and feeds back to the wave energy device, when the wave energy device recognizes the harsh sea conditions, it will turn off the power generation function of the wave energy device and retain the damping and limiting functions to form a reverse pitching moment, which is used to resist the overturning moment formed by the wind and wave loads, and ensure the safety of the wind and wave integrated system in harsh environments.

3. The invention takes the stable operation and survival guarantee of the floating wind turbine as the premise and makes the wave energy device participate in maintaining the stability of the wind turbine. In addition, the wave power generation does not need to be connected to the power grid but provides the in-situ energy for PTO active control and fan control, which effectively solves the safety problems of floating wind turbines and the utilization of the wave power generation.
4. The shell of the wave energy device and the counterweight block form a double resonance system, which is manifested as two resonance frequencies. Two peaks are superimposed on the energy-gaining frequency band, which effectively increases the energy-gaining frequency bandwidth.

The following is a further detailed description of the technical solution of the invention through drawings and an embodiment.

MARKS IN THE FIGURES

Figure 1:
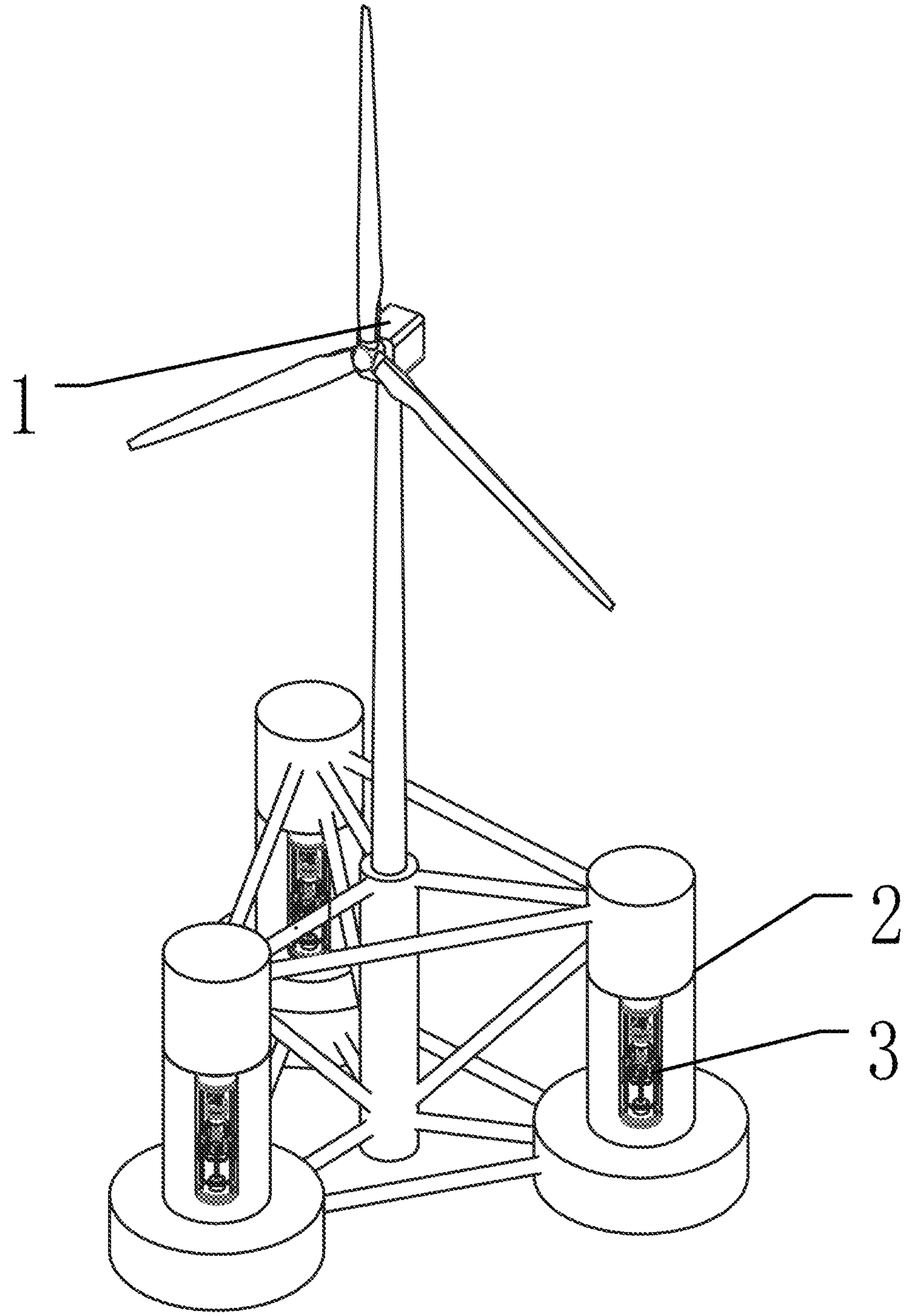
FIG. 1 is a structural schematic diagram of the kinetic energy recovery wind-wave integrated system in the embodiment of this invention.
Figure 2:
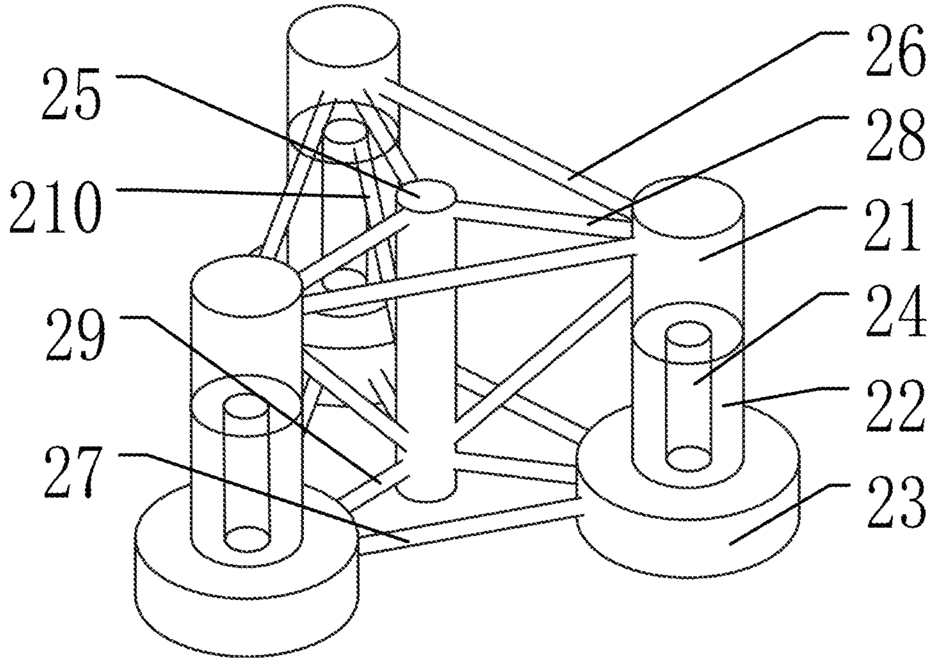
FIG. 2 is a structural schematic diagram of the semi-submersible platform of the kinetic energy recovery wind-wave integrated system in the embodiment of this invention.
Figure 3:
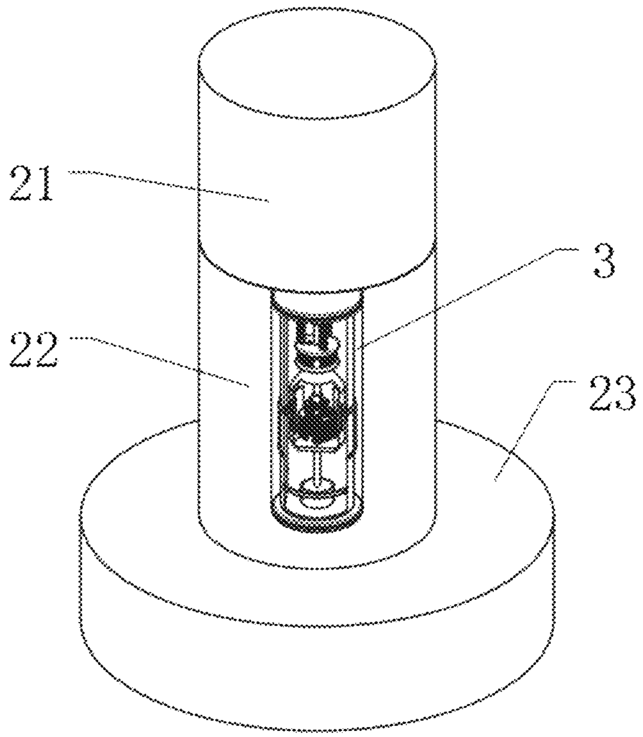
FIG. 3 is a structural schematic diagram of the installation of the wave energy device the kinetic energy recovery wind-wave integrated system of the invention in the embodiment of this invention.
Figure 4:
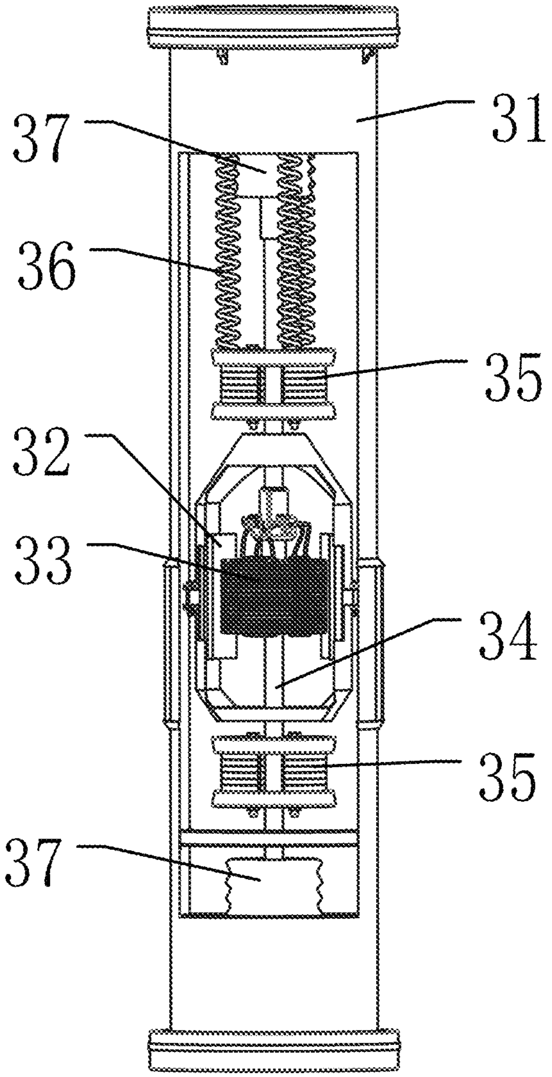
FIG. 4 is a structural schematic diagram of the wave energy device of the kinetic energy recovery wind-wave integrated system in the embodiment of the invention.

- 1, fan; 2, semi-submersible platform; 21, upper pontoon; 22, lower pontoon; 23, base; 24, installation groove; 25, installation rod; 26, upper connecting rod; 27, lower connecting rod; 28, upper intermediate rod; 29, lower intermediate rod; 210, slant beam;
- 3; wave energy device; 31, shell; 32, stator; 33, mover; 34, sliding rod; 35, counterweight block; 36, spring; 37, limiter.

DETAILED DESCRIPTION OF THE EMBODIMENTS

The following is a further explanation of the technical solution of the invention through drawings and embodiment.

Unless otherwise defined, the technical terms or scientific terms used in the invention should be understood by people with general skills in the field to which the invention belongs. The words 'first', 'second', and the like used in this invention do not represent any order, quantity, or importance, but are only used to distinguish different components. Similar words such as 'comprise' or 'include' mean that the elements or objects appearing before the word cover the elements or objects listed after the word and their equivalents, without excluding other elements or objects. Similar terms such as 'connected' or 'connecting' are not limited to physical or mechanical connections, but can include electrical connections, whether direct or indirect. 'Up', 'down', 'left', 'right', etc. are only used to represent the relative positional relationship, when the absolute position of the described object changes, the relative positional relationship may also change accordingly.

Embodiment

As shown in FIGS. 1-5, a kinetic energy recovery wind-wave integrated system includes a semi-submersible platform 2, a fan 1 is arranged on the semi-submersible platform 2, and a wave energy device 3 is arranged inside the semi-submersible platform 2. The semi-submersible platform 2 includes a lower pontoon 22, the upper pontoon 21 is arranged above the lower pontoon 22, and the upper pontoon 21 is sealed and fixedly connected to the lower pontoon 22. The upper pontoon 21 and the lower pontoon 22 provide buoyancy and support for the entire system. The bottom of the lower pontoon 22 is provided with a base 23, and the base 23 is fixedly connected to the lower pontoon 22. The lower pontoon 22 is equipped with an installation groove 24 for the installation of the wave energy device 3. The lower pontoon 22 and the upper pontoon 21 protect the wave energy device 3, so that the wave energy device 3 can work under the condition of isolating the complex marine natural environment, which is beneficial to improve the life and stability of the wave energy device 3.

The center of the semi-submersible platform 2 is equipped with the installation rod 25, and the fan 1 is fixedly arranged on the installation rod 25, the fan 1 uses existing wind turbines for offshore wind power generation. In this embodiment, three pontoons are set, each pontoon is composed of the upper pontoon 21 and the lower pontoon 22. Three pontoons form an equilateral triangle structure, and the installation rod 25 is located on the center of gravity of the equilateral triangle. The upper part of the installation rod 25 is fixedly connected to the upper pontoon 21 through the upper intermediate rod 28, the lower part of the installation rod 25 is fixedly connected to the base 23 through the lower intermediate rod 29, and the lower part of the installation rod 25 is fixedly connected to the upper pontoon 21 through the slant beam 210, which improves the stability and support strength of the installation rod 25. The adjacent upper pontoons 21 are fixedly connected by the upper connecting rod 26, and the adjacent base 23 is fixedly connected by the lower connecting rod 27, which is beneficial to improve the stability of the support of the semi-submersible platform 2.

The wave energy device 3 includes a shell 31, which is fixedly arranged in the installation groove 24 of the lower pontoon 22. The inside of the shell 31 is equipped with a PTO system, the PTO system includes a permanent magnet synchronous linear motor and an active controller, the stator 32 of the permanent magnet synchronous linear motor is fixed inside the shell 31, the mover 33 of the permanent magnet synchronous linear motor is fixed on the sliding rod 34, two ends of the sliding rod 34 are fixed with counterweight blocks 35, which is located outside the permanent magnet synchronous linear motor. The sliding rod 34 is sliding connected to the shell of the permanent magnet synchronous linear motor, and the mover 33 is rigidly connected to the counterweight block 35 through the sliding rod 34. The counterweight block 35 on the upper part of the shell 31 is connected to the top of the shell 31 by a spring 36. The spring 36 is evenly distributed on the counterweight block 35, and two ends of the spring 36 are fixedly connected to the counterweight block 35 and the shell 31 respectively. Under the tension of the spring 36, the gravity of the mover 33 is balanced, so that the mover 33 is in the motion equilibrium position under the static condition. The top and bottom of the shell 31 are provided with a limiter 37 to limit the counterweight block 35, which reduces the impact of the counterweight block 35 on the top of the shell 31.

The counterweight block 35 and the shell 31 form a multi-resonance system, the mass of the shell 31 and its damping in water are a set of resonant systems, and the damping provided by the counterweight block 35 and the spring 36 is another set of resonance systems.

The motion equation of the multi-resonance system is as follows:

$$\begin{Bmatrix} (M-m+A)\ddot{x}_{outer} = F_{water} - F_{PTO} \\ m\ddot{x}_{inner} = F_{PTO} \end{Bmatrix}$$

where M is the mass of the wave energy device 3, m is the mass of the counterweight block, and A is the additional mass, $\ddot{x}_{inner}$ is the motion acceleration of the counterweight block, $\ddot{x}_{outer}$ is the motion acceleration of the shell, $F_{water}$ is the force of the shell in the water, and $F_{PTO}$ is the force between the PTO system and the shell.

The state of the wave energy device 3 includes the working mode and the survival mode.

Working mode, when the marine environment conforms to the work of the wind and wave integrated system, the wave energy device 3 turns on the power generation mode.

Survival mode, when there are freak waves or extreme sea conditions in the sea, extreme sea conditions usually refer to the abnormally large wave height in the wave sequence within a limited time, and the wave energy device 3 is in a protective state, that is, the survival mode turns on. In the survival mode, the generator of wave energy is turned off, only its damping function is retained, and the limiter 37 is started to prevent the counterweight block 35 from hitting the top of the device during the movement.

The freak waves satisfy the following conditions:

The maximum wave height is 2 times larger than the effective wave height, denoted as $\alpha=H_m/H_s=2.0$, where $H_m$ is the maximum wave height and $H_s$ is the effective wave height.

The wave height of the sea wave is detected by setting the wave sensor of the existing structure on the semi-submersible platform 2, the wave sensor is electrically connected to the active controller in the wave energy device 3, and the active controller is electrically connected to the limiter 37 and the battery by using the existing technology as needed. The battery is used to store the electrical energy converted by the wave energy device 3 and provide electrical energy for the operation of the wave energy device 3 and the operation of the fan 1.

Figure 5:
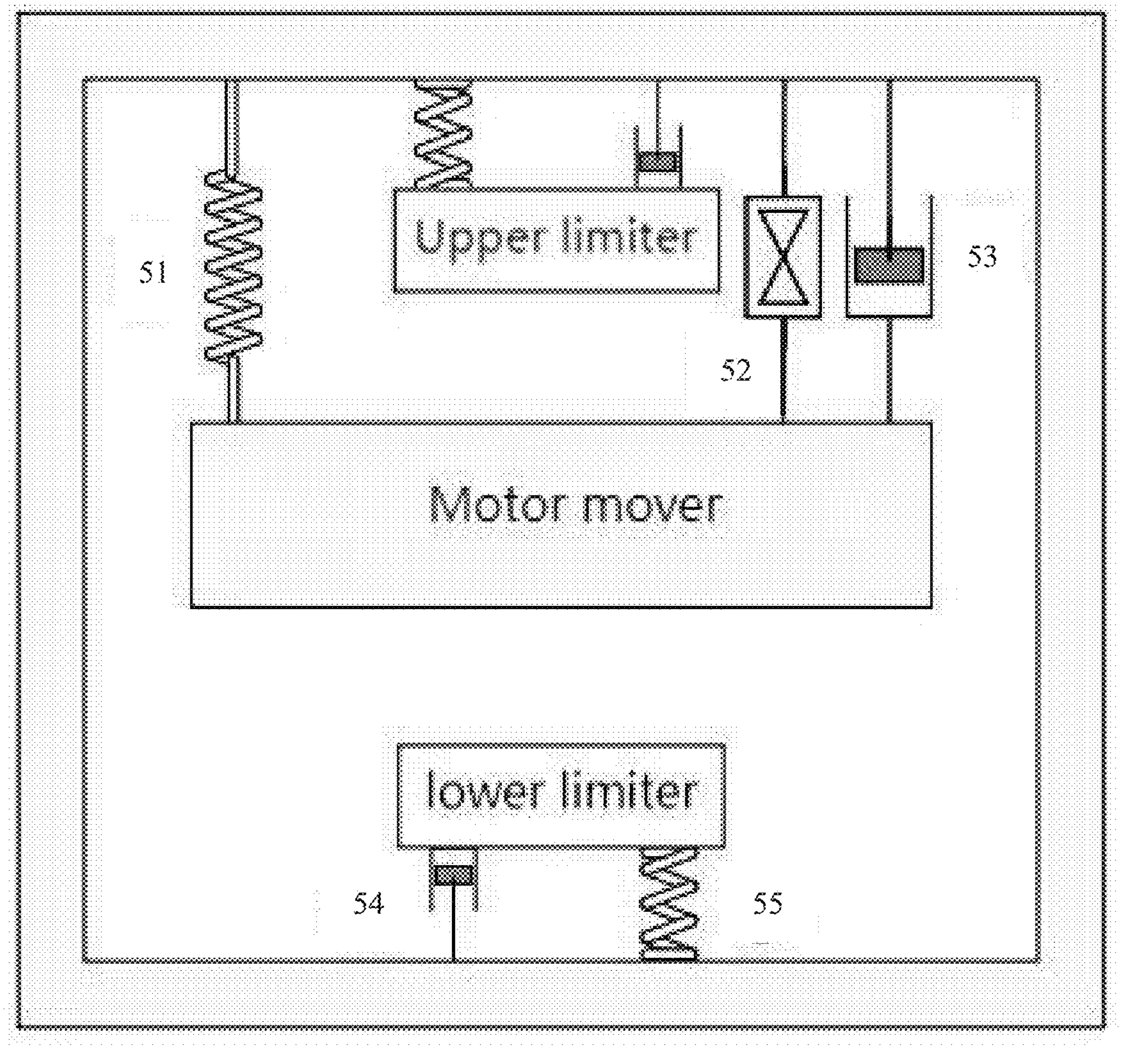
FIG. 5 is a structural schematic diagram of the PTO system of the kinetic energy recovery wind-wave integrated system in the embodiment of the invention.

Referring to FIG. 5, during the movement, the mover 33 is subjected to the PTO spring force 51, the active control force 52, the PTO damping force 53, the damping force 54 of the limiter 37, and the spring 36 force 55, the kinetic energy is absorbed to protect the fan 1 and improve the stability of the operation of the fan 1.

In the working mode, the sea wave drives the wave energy device 3 to move through the semi-submersible platform 2, when the wave energy moves, the counterweight block 35 drives the mover 33 to slide up and down inside the shell 31 through the sliding rod 34, the mover 33 generates electrical energy during the up and down sliding process, and the generated electrical energy is stored in the battery.

In the survival mode, the upper and lower limiters 37 work, and the limiter is tightly attached at both ends of the upper and lower counterweight blocks 35, and the counterweight blocks 35 and the mover 33 are limited to ensure the safety of the system.

Therefore, the invention adopts the above-mentioned kinetic energy recovery wind-wave integrated system, the wave energy device is used to absorb the kinetic energy that is not conducive to the stability of the wind turbine and converts it into available electric energy through the PTO system, which can solve the problem of low stability and safety of offshore wind turbine power generation.

Finally, it should be explained that the above embodiments are only used to explain the technical solution of the invention rather than restrict it. Although the invention is described in detail concerning the better embodiment, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A kinetic energy recovery wind-wave integrated system comprising:

- a semi-submersible platform with an installation groove;
- a fan arranged on the semi-submersible platform;
- a wave energy device arranged inside the installation groove of the semi-submersible platform, wherein the wave energy device comprises:
  - a sliding rod;
  - at least two counterweight blocks, each one is fixed on either ends of the sliding rod;
  - a shell configured to be received within the installation groove, wherein the shell is configured to receive a PTO system, wherein:
    - the PTO system comprises an active controller and a permanent magnet synchronous linear motor comprising a stator and a mover;
    - the stator is fixedly connected to the shell;
    - the mover is fixed on the sliding rod;
    - the at least two counterweight blocks are disposed outside the permanent magnet synchronous linear motor; one of the at least two counterweight blocks is connected to top portion of the shell via a plurality of springs, wherein one end of the plurality of springs are connected to the one of the at least two counterweight blocks and another end of the plurality of springs are connected to the top portion of the shell; and
  - at least two limiters, wherein one limiter is disposed towards interior of the shell and fixedly connected to the top portion of the shell and the other limiter is disposed towards the interior of the shell and fixedly connected to bottom portion of the shell; wherein the sliding rod is disposed in the shell along an axial direction of the shell; one end of the sliding rod passes through the one limiter and the top portion of the shell and is connected to the one limiter and the top portion of the shell in a sliding manner, the other end of the sliding rod passes through the other limiter and the bottom portion of the shell and is connected to the other limiter and the bottom portion of the shell in a sliding manner; and a battery, wherein the battery is configured to store electrical energy converted by the wave energy device, wherein:

the active controller is electrically connected to the limiters and the battery;

the wave energy device is configured to operate in any one of a working mode or a survival mode using the electrical energy stored in the battery wherein:

in the working mode, the wave energy device is configured to turn on a power generation mode of the wave energy device; and in the survival mode, the active controller in the wave energy device is configured to turn off the power generation mode of the wave energy device; and the at least two limiters are configured to mechanically limit movement of the at least two counterweight blocks during the working mode and the survival mode of operation of the wave energy device.

2. The kinetic energy recovery wind-wave integrated system according to claim 1, wherein:

the semi-submersible platform comprises at least three pontoon structures and an installation rod wherein each pontoon structure comprises:

a lower pontoon wherein, an inner part of the lower pontoon comprises an installation groove for installing the wave energy device;

an upper pontoon disposed on an upper part of the lower pontoon; and a base disposed towards a bottom portion of the lower pontoon;

the fan is arranged on the installation rod;

at least one upper intermediate rod connects each of the upper pontoons of the at least three pontoon structures to an upper part of the installation rod;

at least one lower intermediate rod connects a first portion of the base of each of the at least three pontoon structures to a lower part of the installation rod;

at least one upper connecting rod connects adjacent upper pontoons of each of the at least three pontoon structures;

at least one lower connecting rod connects a second portion of each of the adjacent bases of the at least three pontoon structures; and at least one slant beam connects a lower part of the installation rod to the upper pontoon of each of the at least three pontoon structures.

3. The kinetic energy recovery wind-wave integrated system according to claim 2, wherein each pontoon structure comprises a multi-resonance system formed by the at least two counterweight blocks and the shell, wherein, a mass of the shell and a damping of the shell within water form one set of resonant systems, and a damping provided by the at least one counterweight block and a damping of the spring forms another set of resonance system; and the multi-resonance system comprises a plurality of means to obtain a mass of the wave energy device, a force of the shell in water and a force between the PTO system and the shell, wherein the multi-resonance system is configured to provide a measure of the motion of the multi-resonance system as follows:

$$\begin{Bmatrix} (M - m + A)\ddot{x}_{outer} = F_{water} - F_{PTO} \\ m\ddot{x}_{inner} = F_{PTO} \end{Bmatrix}$$

wherein M is the mass of the wave energy device, m is a mass of the counterweight block, and A is an additional mass, $\ddot{x}_{inner}$ is a motion acceleration of each of the at least two counterweight blocks, $\ddot{x}_{outer}$ is a motion acceleration of the shell, $F_{water}$ is the force of the shell in the water, and $F_{PTO}$ is the force between the PTO system and the shell.

4. The kinetic energy recovery wind-wave integrated system according to claim 1, wherein the system comprises a wave sensor to enable the wave energy device to operate in any one of the working mode and the survival mode wherein:

the active controller is configured to turn ON the wave energy device to enable the wave energy device to operate in the working mode when the wave sensor senses an effective wave height $H_s$ of a sea wave, thereby enabling the wave energy device to generate electricity.

5. The kinetic energy recovery wind-wave integrated system according to claim 4, wherein the wave energy device is configured to operate in survival mode upon detection of a freak wave, wherein the freak wave is detected by the wave sensor when a maximum wave height $H_m$ is two times larger than the effective wave height $H_s$.

* * * * *